United States Patent [19]

Yun

[11] Patent Number: 5,326,578
[45] Date of Patent: Jul. 5, 1994

[54] METHOD OF CONTROLLING A FOOD THAWING APPARATUS

[75] Inventor: Kwang-Hyun Yun, Kyonggi, Rep. of Korea

[73] Assignee: Samsung Electronics, Co., Ltd., Suwon, Rep. of Korea

[21] Appl. No.: 16,276

[22] Filed: Feb. 11, 1993

[30] Foreign Application Priority Data

Feb. 17, 1992 [KR] Rep. of Korea .......... 92-2324

[51] Int. Cl.$^5$ ............................................. A23B 4/06
[52] U.S. Cl. .................................... 426/231; 426/418; 426/524
[58] Field of Search ............... 426/231, 418, 524

[56] References Cited

U.S. PATENT DOCUMENTS 4,898,741 2/1990 Heide ................................. 426/231

Primary Examiner—Leo B. Tentoni
Attorney, Agent, or Firm—Burns, Doane, Swecker & Mathis

[57] ABSTRACT

A refrigerator has a multi-purpose chamber in which foods can be selectively cooled or thawed. Thawing is performed by actuating a heater at the top of the chamber. The heat is circulated within the chamber by a flow of cooled air received through an orifice at the rear of the chamber. If the temperature within the chamber reaches a predetermined temperature after a minimum time period has elapsed, then the heater is deactivated. If the predetermined temperature has not been reached, then the heater remains activated until a maximum time period elapses, whereupon the heater is deactivated regardless of the sensed temperature. After the heater is deactivated, cooled air is continued to be supplied to the chamber for a preselected time period.

6 Claims, 6 Drawing Sheets

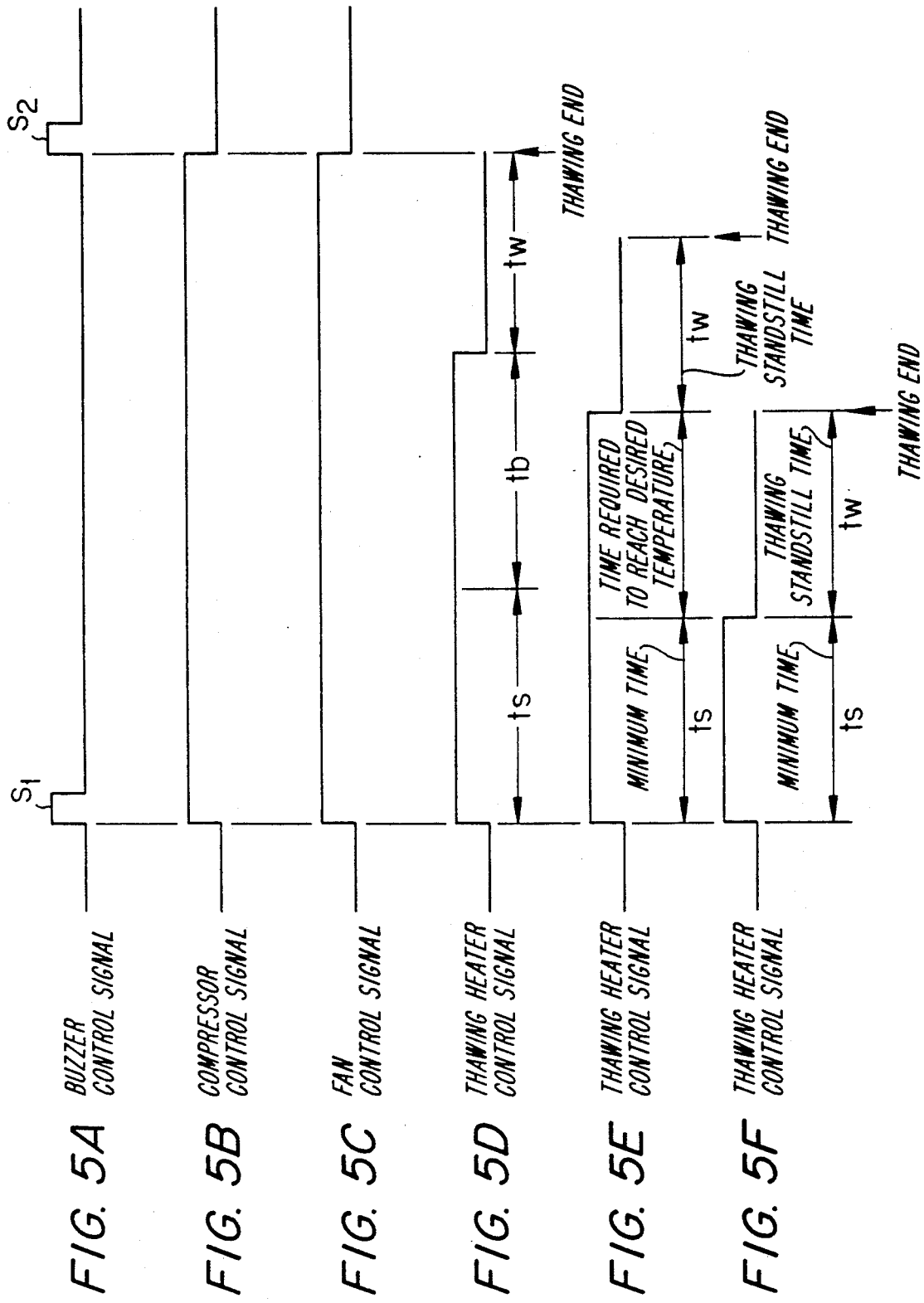

METHOD OF CONTROLLING A FOOD THAWING APPARATUS

BACKGROUND OF THE INVENTION

1. Field of the Invention

The present invention relates to a refrigerator, more particularly, to a thawing apparatus for a refrigerator.

2. Description of the Prior Art

In general, such a refrigerator having a thawing apparatus includes a separative thawing or multi-purpose chamber 70 arranged between a freezing chamber 100 and a cooling chamber 200, as shown in FIG. 1.

A heater 72 is disposed at an upper side of the thawing chamber 70 and a thawing fan 74 is provided at a rear side of the thawing chamber 70 and functions to circulate a heat generated by the heater 72.

An evaporator 76 is disposed between the freezing chamber 100 and the thawing chamber 70 to cool an air introduced. That is, the evaporator 76 cools the air by using a refrigerant which is compressed by a compressor 78 and circulated in the refrigerator. In this case, the air is increased in temperature by passing through the freezing and cooling chambers 100 and 200 and then introduced into the evaporator 76 through inlet orifices 80 and 82. The air cooled by the evaporator 76 flows into a cooled air path 86 upon the operation of a fan member 84 and simultaneously flows into a guide channel 88 through a cooled air orifice 92a which is controlled to be close and open by a damper 90.

The air introduced in the cooled air path 86 is supplied to the freezing chamber 100 through a cooled air orifice 92b, while the cooled air introduced in the guide channel 88 is supplied to the cooling chamber 200 through multiple cooled air orifices 94a to 94c.

A thawing damper 96 serves to control the cooled air introduced in the guide channel 88 from being passed though a cooled air orifice 98.

In the construction of such a refrigerator described above, when the thawing chamber 70 is used as a general-purpose cooling chamber or special-purpose chamber, the cooled air orifice 98 is opened by the thawing damper 96 so as to supply the cooled air in the guide channel 88 into the thawing chamber 70.

Alternatively, when using the thawing chamber 70 for the purpose of thawing frozen foods the cooled air orifice 98 is closed and then a power supply voltage is applied to operate the heater 72 and the thawing fan 74.

Accordingly, the heater 72 is heated and, hence, the heat produced from the heater 72 is circulated within the thawing chamber 70 by the thawing fan 74.

With such a refrigerator thus constructed, however, the thawing fan and the thawing damper are essentially needed, so a construction is complicated and thereby a manufacturing cost for the product is increased undesirably.

SUMMARY OF THE INVENTION

Accordingly, an object of the present invention is to provide a thawing apparatus for a refrigerator an a method of controlling the same, in which a thawing fan, and no thawing damper are provided thereby simplifying a construction decreasing a cost.

TO achieve the above object, according to a preferred aspect of the present invention, there is a thawing apparatus for a refrigerator, comprising: a thawing container disposed movably forward and backward in a special-purpose chamber; a thawing heater located at an upper side of the thawing container for generating heat; a cooled air orifice for introducing a cooled air into the thawing container; a thawing temperature sensor for sensing a temperature of the thawing container; and, a control means for controlling the thawing heater, a compressor and fan members on the basis of the temperature sensed by the sensor and a operation menu selected by an user.

According to another aspect of the prsent invention, there is a method of controlling a thawing apparatus for a refrigerator, comprising the steps of: ( a ) driving a compressor, a fan and a heater employed to the refrigerator to thaw frozen foods contained in a thawing chamber; (b) effecting a thawing function for a minimum thawing time according to a menu selected; (c) determining whether the temperature of the thawing chamber is above a thawing temperature corresponding to the menu after the thawing function has been effected for the minimum thawing time; (d) continuously effecting the thawing function for a maximum thawing time when the temperature of the thawing chamber is below the thawing temperature as the determination result in the step (c); and, (e) maintaining a thawing standstill state when the temperature of the thawing chamber is above the thawing temperature corresponding to the menu or the maximum thawing time is lapsed in effecting the steps (c) and (d).

The above and other objects and advantages of the invention will be understood for the following description taken with conjunction to the accompanying drawings.

BRIEF DESCRIPTION OF THE DRAWINGS

FIGS. 2A and 2B are views of a refrigerator according to the present invention, in which FIG. 2A is a vertical sectional view and FIG. 2B is a front view with the doors removed;

DETAILED DESCRIPTION OF THE INVENTION

Figure 2A:
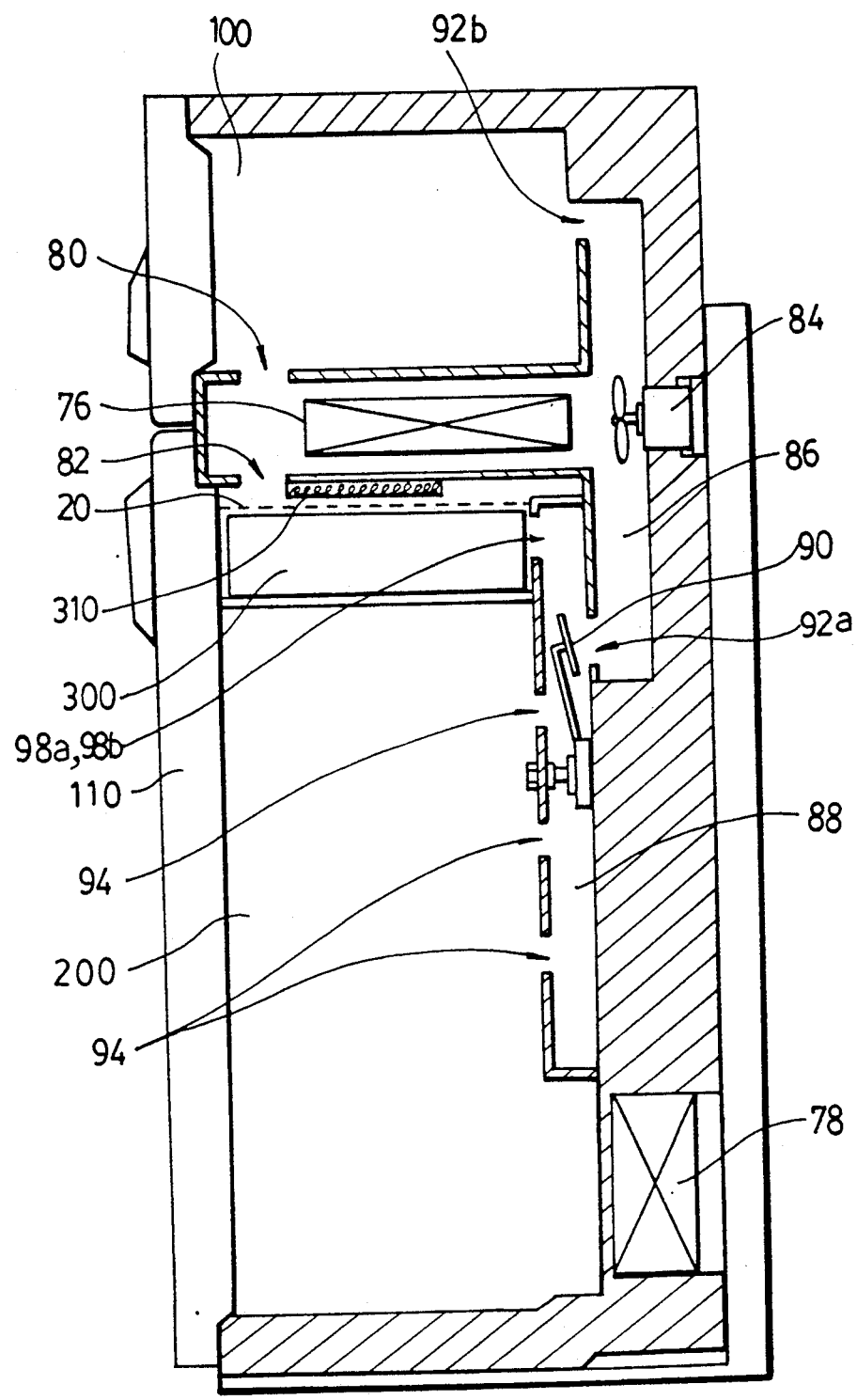

Thereinafter, the present invention will be described in more detail. Referring to FIG. 2A showing a section of a refrigerator employed in the present invention, a special-purpose chamber 400 is defined between a freezing chamber 100 and a cooling chamber 200 and a thawing chamber 300 is formed adjacent the special-purpose chamber 400.

At a rear surface of the thawing chamber 300 and the special-purpose chamber 400, cooled air orifices 98a and 98b are formed, respectively, through which a cooled air flow, and a temperature sensor 320 is located in the thawing chamber 300 for sensing a temperature of the interior of the thawing chamber 300.

A heater 310 for producing heat is arranged at an upper side of the thawing chamber 300 and a protection net 20 is provided between the thawing chamber 300 and the heater 310 so as to prevent damage, for example, a burning of a user due to the contact with the heater 310.

Figure 2B:
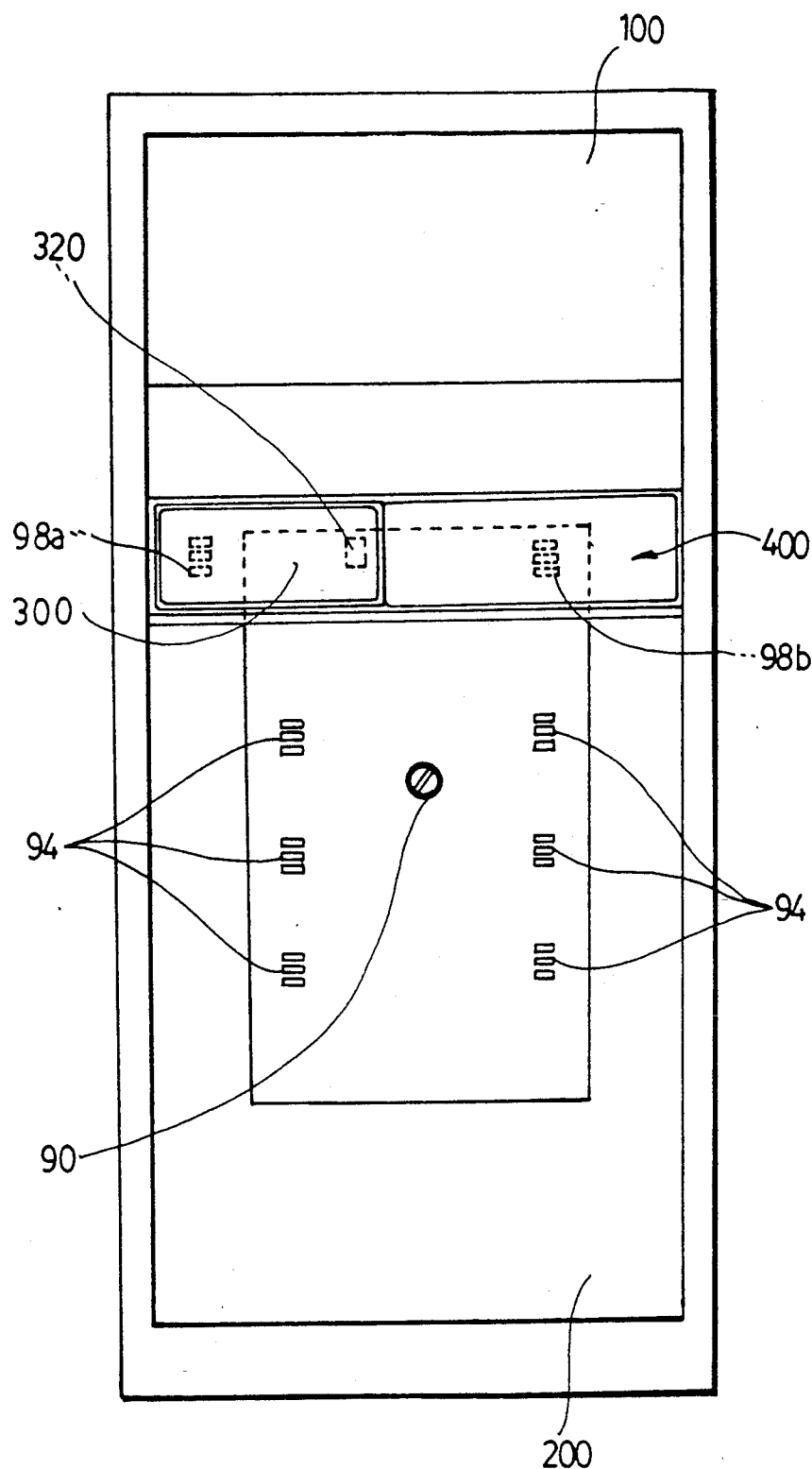
Figure 3A:
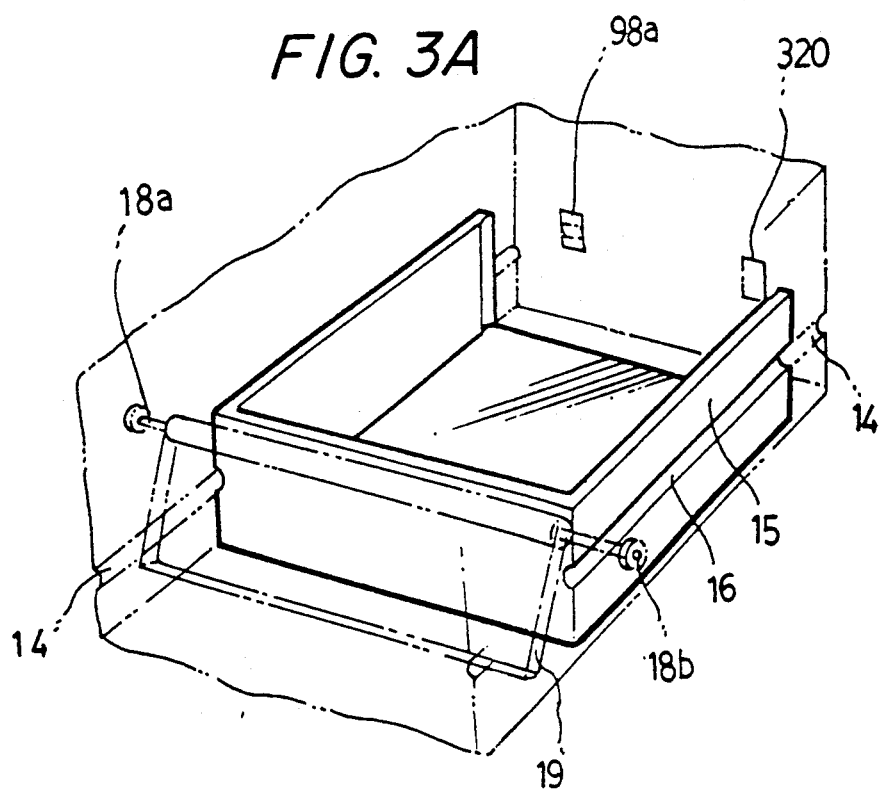
FIG. 3A and 3B are detailed views of main parts of the apparatus shown in FIG. 2, in which 3A is a top perspective view and 3B is a side view of a multi-purpose chamber view.
Figure 3B:
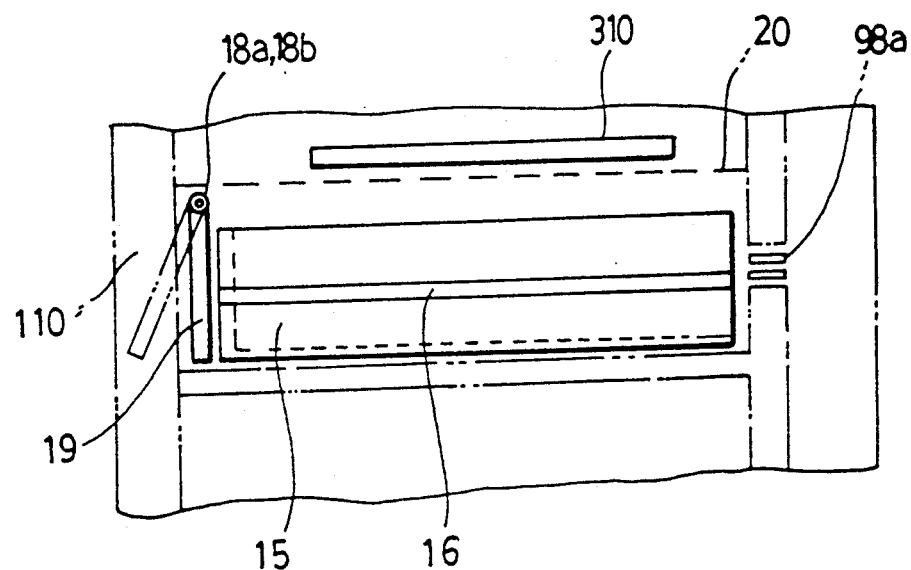

FIGS. 3A and 3B are detailed views of the thawing chamber 300 shown in FIG. 2 in which FIG. 3A is perspective view and FIG. 3B is a sectional view.

Referring to FIG. 3A, a thawing container 15 is disposed in the thawing chamber 300 having the thawing temperature sensor 320 and the cooled air orifice 98a formed at the rear surface thereof.

At the front surface and right and left surfaces, the thawing container 15 is walled and, at a rear side, is opened. Linearly extended recesses 16 are formed at the right and left surface of the thawing container 15, respectively. Therefore, guide rails 14 formed at right and left side walls of the thawing chamber 300 are suitably accommodated in the recesses 16, respectively. Accordingly, the thawing container 15 can be moved frontward and backward along the guide rails 14.

At the front surface of the thawing container 15, a cover member 19 is supported by right and left shafts 18a and 18b. More specifically, the shafts 18a and 18b are inserted in the upper side of the cover member 19 so that the latter is rotatable around the right and left shafts 18a and 18b.

A thawing heater 310 is proposed at the upper side of the thawing container 15 and the protection net 20 is disposed between the thawing container 15 and the thawing heater 310. When the heater 310 is deactivated under the user's control the thawing chamber 300 serves as a special-purpose chamber. Alternatively, when the heater is operated, the thawing chamber 300 effects a given function to thaw frozen foods.

Meanwhile, an evaporator 76 is provided between the freezing chamber 100 and the thawing chamber 300 to cool the air by using a refrigerant compressed by a compressor 78 and circulated in the refrigerator.

The air cooled by the evaporator 76 is introduced in the cooled air path 86 by the fan member 84 disposed at the rear surface of the refrigerator. A portion of that cooled air is supplied to the guide channel 88 through the cooled air orifice 92a which is opened or closed by the damper 90.

The rest of the cooled air induced in the cooled air path 86 is supplied to the freezing chamber 100 through the cooled air orifice 92b, while a portion of the cooled air induced in the guide channel 88 is supplied to the cooling chamber 200, and another portion is supplied to the thawing chamber 300 and the special-purpose chamber 400 through the cooled air orifices 94, 98a and 98b.

The temperature of the cooled air introduced in the freezing chamber 100, the cooling chamber 200, the thawing chamber 300 and the special-purpose chamber 400 is increased by heat-exchanging with the foods stored in the respective chambers 100, 200, 300 and 400. The air thus increased in temperature is introduced through inlet orifices 80 and 82 to the evaporator so as to be cooled.

Now, the operation and effect of the refrigerator according to the present invention will be described.

Referring to FIGS. 2A and 2B, the thawing chamber 300 is normally used for the same purpose as the special-purpose chamber 400 wherein no power is supplied to the thawing heater 310. The evaporator 76 cools the air by using the refrigerant compressed by the compressor 78 and the fan member 84 supplies the cooled air into the cooled air path 86. The cooled air is then supplied through the cooled air orifice 92b to the freezing chamber 100 so as to freeze the foods stored in the chamber 100.

Moreover, the cooled air introduced in the cooled air path 86 is supplied to the guide channel 88 through the cooled air orifice 92a which is automatically closed or opened by the damper 90 in accordance with the reference temperature of the cooling temperature 200 previously set by the user.

That is, when the temperature of the cooling chamber 200 is below the reference temperature, the orifice 92a is closed by the damper 90. Alternatively, when the temperature of the chamber 200 is above the reference temperature, the orifice 92a is opened by the damper 90 so that the cooled air in the path 86 is introduced to the guide channel 88 and then supplied to the thawing chamber and the chambers 300 and 400 and the cooling chamber 200. At this time, the thawing heater 310 is non-operating and, therefore, the thawing chamber 300 performs the same function as the special-purpose chamber 400.

Thereinafter, the cooled air is increased in temperature by heat-exchanging with the foods stored in the chambers 100, 200, 300 and 400. The air increased in temperature is introduced in the evaporator 76 through the inlet orifices 80 and 82. Accordingly, the air is cooled again by the evaporator 76.

When the foods are put into the thawing chamber 300 for thawing them, a door of the refrigerator is opened and the cover member 19 in FIGS. 3A and 3B is raised by the user by being rotated around the right and left shafts 18a and 18b so as to allow the thawing container 15 to be taken out of the thawing chamber 300.

More specifically, the thawing container 15 is moved forwardly along the guide rails 14 so as to receive the frozen foods, and then slid back into the thawing chamber 300. After the thawing container 15 has been completely inserted in the refrigenator, the cover member 19 is closed by way of its own weight. Under this condition, when the door 110 is closed and the operation button (i.e., a thawing button) (not shown) is selected, the heater 310 is operated by a controller (not shown) to thereby thaw the frozen foods. Simultaneously, when the compressor 78 is operated, the air flowing in the refrigerator is cooled by the evaporator 76 using the refrigerant. The air thus cooled is introduced in the cooled air path 86 by the fan member 84. Consequently, the cooled air in the path 86 is supplied to the freezing chamber 100 through the cooled air orifice 92b and simultaneously introduced in the guide channel 88 through the cooled air orifice 92a controlled by the damper 90.

The cooled air in the channel 88 is supplied to the cooling chamber 200 through the cooled air orifice 94 and simultaneously supplied to the thawing chamber 300 and the special-purpose chamber 400 through the cooled air orifices 98a and 98b. Accordingly, the foods in the freezing chamber 100 can be frozen by the cooled air supplied in the chamber 100 and the foods in the chambers 200 and 400 can be cooled by the cooled air supplied in the chambers 200 and 400.

Meanwhile, in the thawing chamber 300, convection current is generated by the cooled air introduced through the cooled air orifice 98a the heat radiating from the heater 310 increases the temperature of the cooled air. Thus, heated air is diffused in the thawing chamber 300 to be evenly contacted with all of the foods.

In this case, the thawing heater 310 is prevented from being over-heated by the cooled air supplied through the cooled air orifice 98*a*. The compressor 78, the fan member 84 and the thawing heater 310 are controlled by a controller (not shown).

It will thus be appreciated that the thawing chamber 300 constitutes a multi-purpose chamber since it can function as a cooling chamber or as a thawing chamber.

Figure 4:
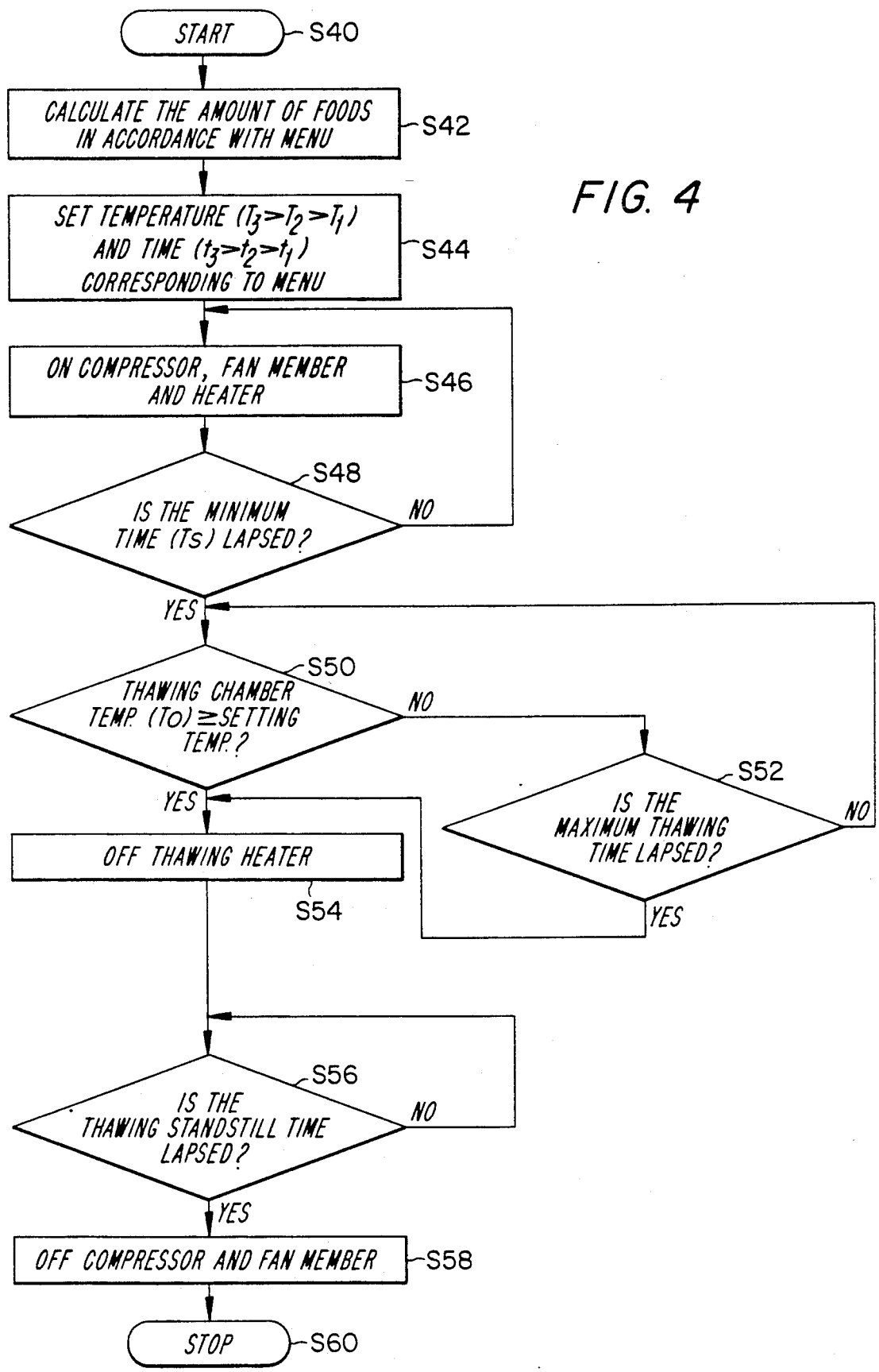
FIG. 4 is a flowchart illustrating a method of controlling the thawing apparatus for a refrigerator according to the present invention; and, FIGS. 5A through 5F are timing charts illustrating an operating state of the refrigerator controlled by the method of FIG. 4.

FIG. 4 is a flowchart illustrating a method of controlling the thawing apparatus of the refrigerator according to the present invention and FIGS. 5A to 5F are timing charts illustrating the operating state of the refrigerator operated by the method shown in FIG. 4.

Referring to FIGS. 4 and 5, if the thawing button is pressed after the frozen foods have been inserted into the thawing chamber 300, the controller in the refrigeator produces a start signal S1 as shown in FIG. 5A to drive a buzzer (not shown) so as to initiate a thawing operation (a step 40).

Consequently, the controller calculates the amount of the foods to be thawed in accordance with a menu selected by the user (a step 42). That is, if the menu is selected on the basis of the amount of the foods, then the controller is set for the amount of the foods in accordance with the menu selected. For example, when the foods are divided into large, medium and small volume and a large key is selected by the user in selecting the menu, then the controller is set for the large amount of the frozen foods. Alternatively, if a medium key is selected, the controller is set for the medium amount of the frozen foods. If a small key is pressed, the controller is set for the small amount of the frozen foods.

Next, the controller determines the thawing temperature T3, T2 or T1, a minimum thawing time ts3, ts2 or ts1 and a maximum thawing time tb3, tb2 or tb1 corresponding to the selected menu (i.e., 'large', 'medium' or 'small') from an internal memory. Herein, the thawing temperature, the minimum thawing time and the maximum thawing time have the following relation, that is, $T3 > T2 > T1$, $t3 > t2 > t1$ and $tb3 > tb2 > tb1$, respectively. Furthermore, the proper temperature "T" and the thawing time "t" are previously set by various experiments and/or calculations according to the kind and amount of the frozen foods.

The temperature "T" and thawing time "t" set as mentioned above are previously stored in the internal memory in such a way that they can be read out in correspondence to the menu.

Thereinafter, the controller produces control signals shown in FIGS. 5B and 5C to operate the compressor and the fan member and simultaneously produces a control signal to operate the thawing heater (a step 46). While operating the compressor, the fan member and the thawing heater at the step 46, the controller determines whether the minimum thawing time ts is lapsed, at a step 48. As a result, if the minimun thawing time ts (=ts1, ts2 or ts3) has lapsed, the controller determines whether the temperature "To" of the thawing chamber sensed by the thawing temperature sensor 320 has reached the predetermined reference temperature T1, T2 or T3 of the selected menu, at a step 50.

If the temperature "To" has not reached the temperature T1, T2 or T3, then the controller determines whether the maximun thawing time "tb" of the selected menu has been lapsed, at a step 52.

As a result, if the maximun thawing time tb (=tb1, tb2 or tb3) has not lapsed, then the controller repeatedly determines whether the temperature "To" reaches the temperature T1, T2 or T3, at the step 50. As the determination result at the steps 48, 50 and 52, if the temperature "To" sensed after the lapse of the minimum thawing time "ts" reaches the temperature T1, T2 or T3, the controller outputs a central signal shown in FIG. 5D to stop the thawing heater, at a step 54.

Alternatively, if the temperature "To" is not reached the temperature T1, T2 or T3, the controller outputs the control signals (FIGS. 5E and 5F) to operate the thawing heater.

Consequently, if the temperature "To" has been increased to the temperature T1, T2 or T3 even through the maximun thawing time "tb" has not lapsed as shown in FIG. 5E, or it the maximun and minimun thawing times "ts" and "tb" have been lapsed under a condition that the temperature "To" has not been increased to the temperture T1, T2 or T3 as shown in FIG. 5F, then the controller ouputs the control signal to stop the thawing heater at the step 54. After the thawing heater has been stopped, a thawing standstill time "tw" is ensured at a step 56, so that the compressor and the fan member are continuously operated to maintain the thawing chamber at a temperature, for example, $-2$ C. at which the frozen foods can be properly thawed.

After the lapse of the thawing standstill time "tw", the compressor and the fan member are stopped under the control of the controller, at a step 58. As the thawing operation has been completed as described above, the controller produces an end signal S2 (FIG. 5A) to operate the buzzer so as to indicate the end of the thawing operation to the user at a step 60 and, hence, the refrigerator is operated in an ordinary manner by the controller. At this time, the thawing chamber is used as a special-purpose chamber with the temperature of $-2$ C. set as described above.

Figure 1:
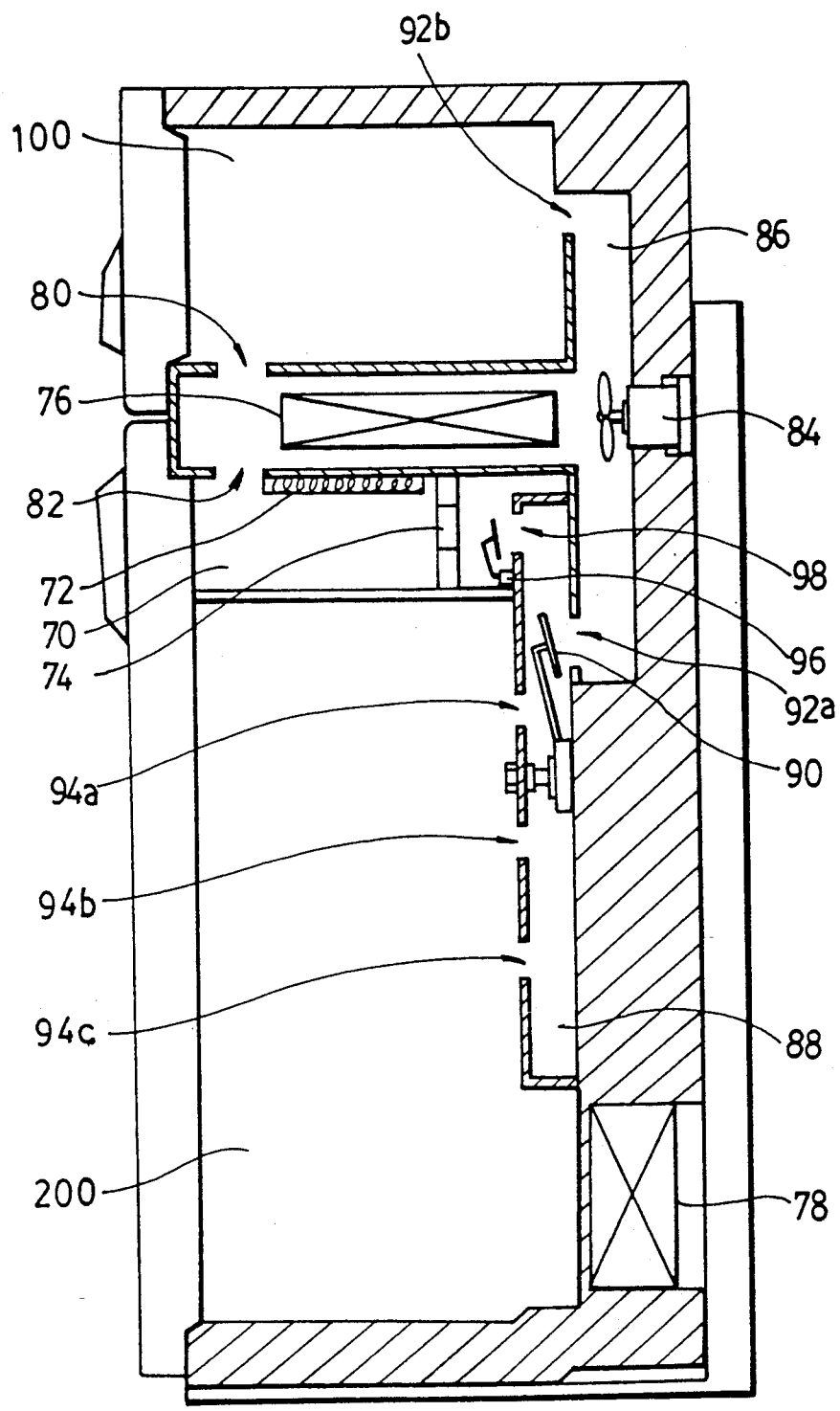
FIG. 1 is a vertical sectional view of a refrigerator having a conventional thawing apparatus.

As mentioned above, according to the present invention the thawing chamber 300 is disposed adjacent a permanent special purpose chamber 400. The unit comprised of both of the chambers 300, 400 could thus be considered to constitute a special purpose unit having a permanent special purpose chamber 400, and a multi-purpose chamber 300 (which can be used for cooling or for thawing). Cooled air is directly introduced in the thawing chamber in the convection current and mixed with the heat produced from the thawing heater so as to allow the frozen foods to be uniformly thawed. Accordingly, the constructioin of a thawing apparatus can be simplified by eliminating the need for damper 96 and fan 74 of FIG. 1.

Further, the thawing temperature and time can be set differently in accordance with the kind and amount of the foods to be thawed. Also, the thawed foods can be preserved at a specified temperature of $-2$ C. proper to cook.

Although the present invention has been described with respect to the specified example, it will be apparatus to those skilled in the art that various changes and modifications can be made therein without departing from the spirit and scope of the invention.

In particular, the size of the forzen foods has been classified into 'large' 'medium' and 'small' in the description, but the thawing temperature and the thawing time can be calculated depending upon data obtailned by various experiments respective of the kind and quality of the foods. Also, the thawing time has been set to that of the maximum and minimum in the aforementioned description, but it may be extended or shorten as needed. Further, the present invention is not limited to the refrigerator and it can be employed to associated cooking devices.

What is claimed is:

1. A method of controlling a food thawing apparatus comprising the steps of:
   A) operating a compressor, an evaporator, and a fan for circulating cooled air,
   B) supplying a portion of said cooled air to a thawing chamber,
   C) operating a heater to heat the cooled air in said thawing chamber,
   D) sensing a temperature in said thawing chamber,
   E) deactivating said heater upon the lapsing of a minimum time period if the sensed temperature has reached a reference temperature, while continuing to operate said heater upon the lapsing of said minimum time period if the sensed temperature has not reached said reference temperature, and
   F) deactivating said heater upon the lapsing of a maximum time period regardless of whether the sensed temperature has reached said reference temperature.

2. A method according to claim 1 including the step of continuing to operate said compressor, evaporator and fan for a preselected time period following the deactivation of said heater in either of steps E and F.

3. A method according to claim 1 including determining said minimum time period as a function of a selected value related to the type and amount of food being thawed.

4. A method according to claim 1 including determining said maximum time period as a function of a selected value related to the type and amount of food being thawed.

5. A method according to claim 1 including determining said reference temperature as a function of a selected value related to the type and amount of food being thawed.

6. A method according to claim 2 including operating a warning buzzer at the end of said continuing step.

* * * * *